No. 761,970. PATENTED JUNE 7, 1904.
R. E. KIMBALL.
TICKET COUNTING AND INSPECTING MACHINE.
APPLICATION FILED JUNE 24, 1903.
NO MODEL. 5 SHEETS—SHEET 1.

Witnesses.
E. B. Filchrist
J. B. Hull.

Inventor:
Robert E. Kimball,
By his Attorneys,
Thurston & Bates

No. 761,970. PATENTED JUNE 7, 1904.
R. E. KIMBALL.
TICKET COUNTING AND INSPECTING MACHINE.
APPLICATION FILED JUNE 24, 1903.
NO MODEL. 5 SHEETS—SHEET 2.

Witnesses.
E. B. Filchurst
J. B. Hull

Inventor:
Robert E. Kimball,
By his Attorneys,
Thurston & Bates.

No. 761,970. PATENTED JUNE 7, 1904.
R. E. KIMBALL.
TICKET COUNTING AND INSPECTING MACHINE.
APPLICATION FILED JUNE 24, 1903.
NO MODEL. 5 SHEETS—SHEET 4.

Witnesses.
E. B. Gilchrist
J. D. Hull

Inventor.
Robert E. Kimball,
By his Attorneys,
Thurston & Bates.

No. 761,970. PATENTED JUNE 7, 1904.
R. E. KIMBALL.
TICKET COUNTING AND INSPECTING MACHINE.
APPLICATION FILED JUNE 24, 1903.
NO MODEL. 5 SHEETS—SHEET 5.
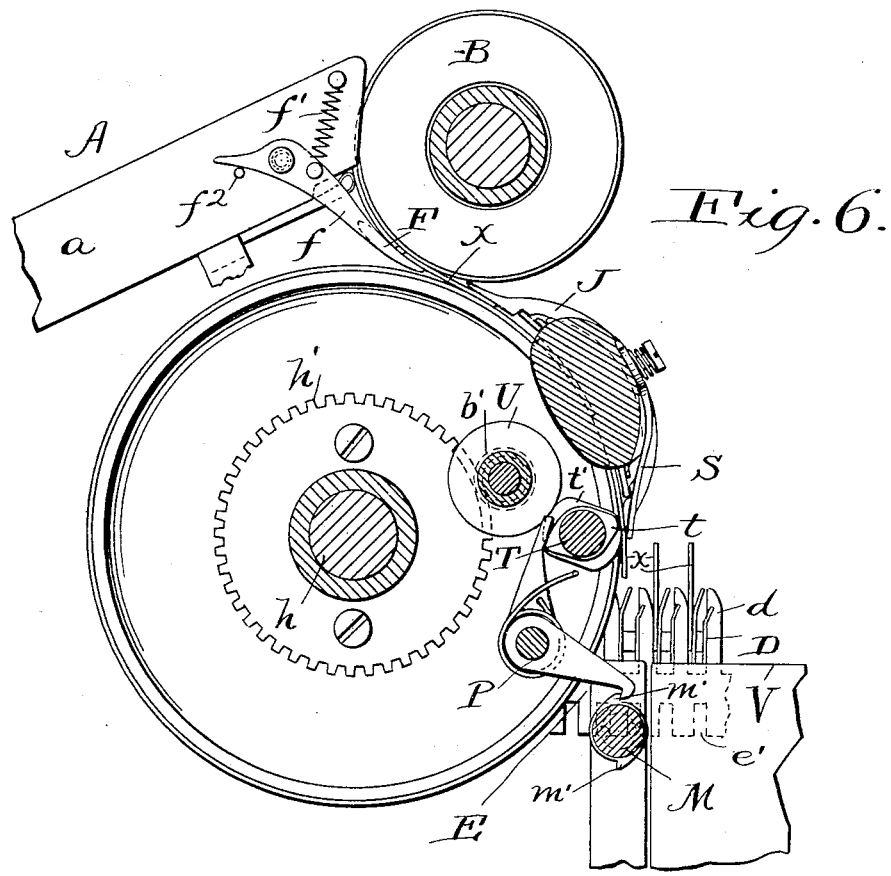
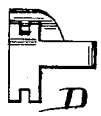
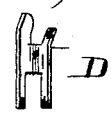
Witnesses.
E. B. Gilchrist
J. B. Hull.
Inventor:
Robert E. Kimball,
By his Attorneys,
Thurston & Bates.

No. 761,970.

Patented June 7, 1904.

UNITED STATES PATENT OFFICE.

ROBERT E. KIMBALL, OF CLEVELAND, OHIO, ASSIGNOR TO THE TICKOMETER COMPANY, OF CLEVELAND, OHIO, A CORPORATION OF OHIO.

TICKET COUNTING AND INSPECTING MACHINE.

SPECIFICATION forming part of Letters Patent No. 761,970, dated June 7, 1904.

Application filed June 24, 1903. Serial No. 162,883. (No model.)

*To all whom it may concern:*

Be it known that I, ROBERT E. KIMBALL, a citizen of the United States, residing at Cleveland, in the county of Cuyahoga and State of Ohio, have invented a certain new and useful Improvement in Ticket Counting and Inspecting Machines, of which the following is a full, clear, and exact description, reference being had to the accompanying drawings.

The invention is a machine with which tickets or analogous pieces of cardboard may be quickly counted and exposed for inspection and then discharged. Such a machine is especially adapted for use by railway companies, which are obliged to count and inspect the tickets turned in by conductors for the purpose of checking up the conductors' reports. The machine includes segregating mechanism by means of which the tickets of a package are segregated and delivered singly into holders in which they are exposed for inspection, the exposing mechanism, and the mechanism for indicating the number of tickets delivered thereto and the mechanism by which the tickets are simultaneously discharged from the embrace of the holders.

The invention consists in the construction and combinations of parts constituting the several mechanisms in the machine and in the combinations of said mechanisms with one another, whereby the several operations are performed upon the tickets in proper sequence to produce the desired results.

Figure 1:
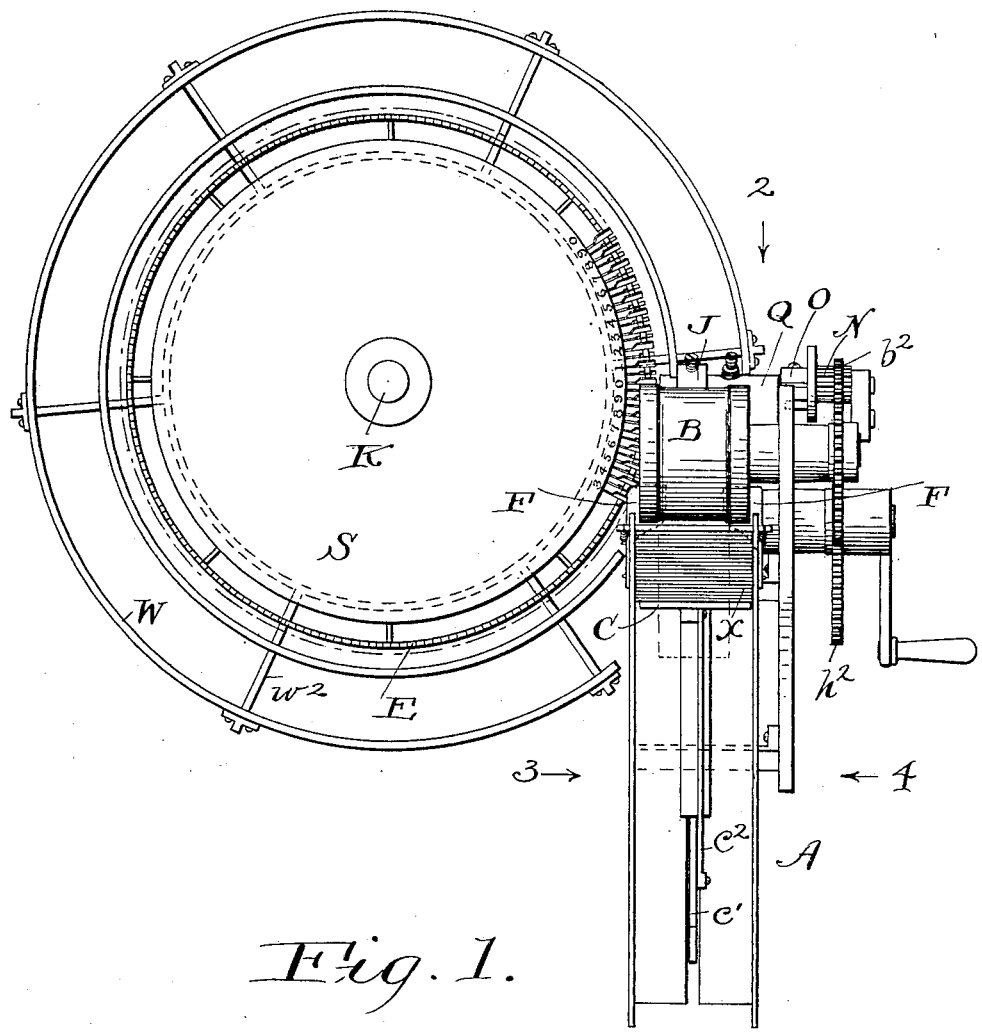
Figure 2:
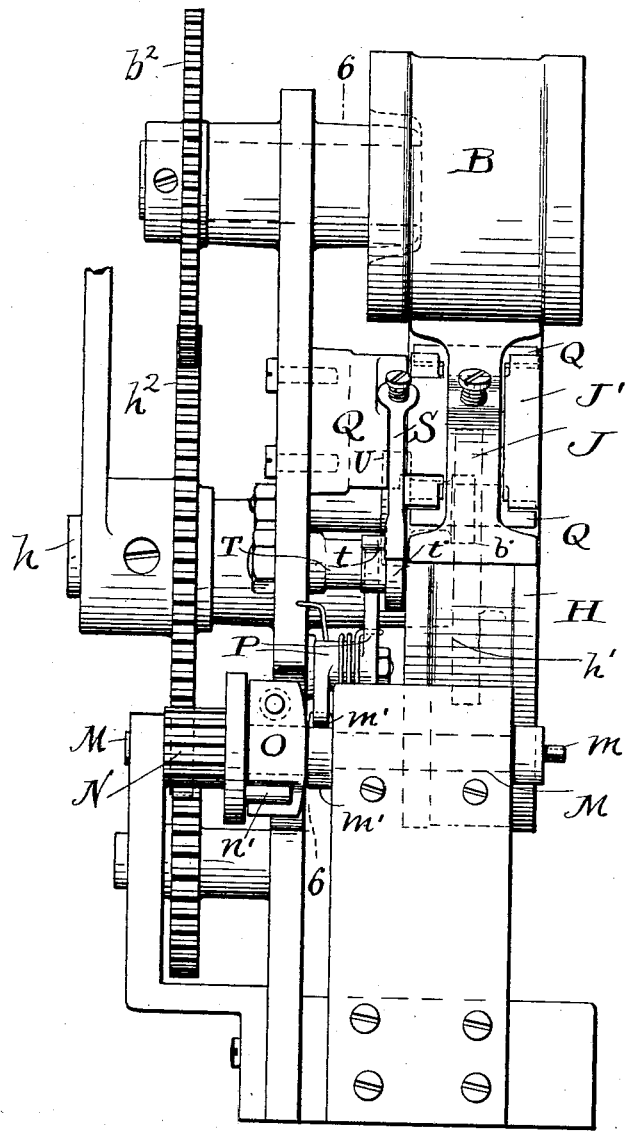
Figure 3:
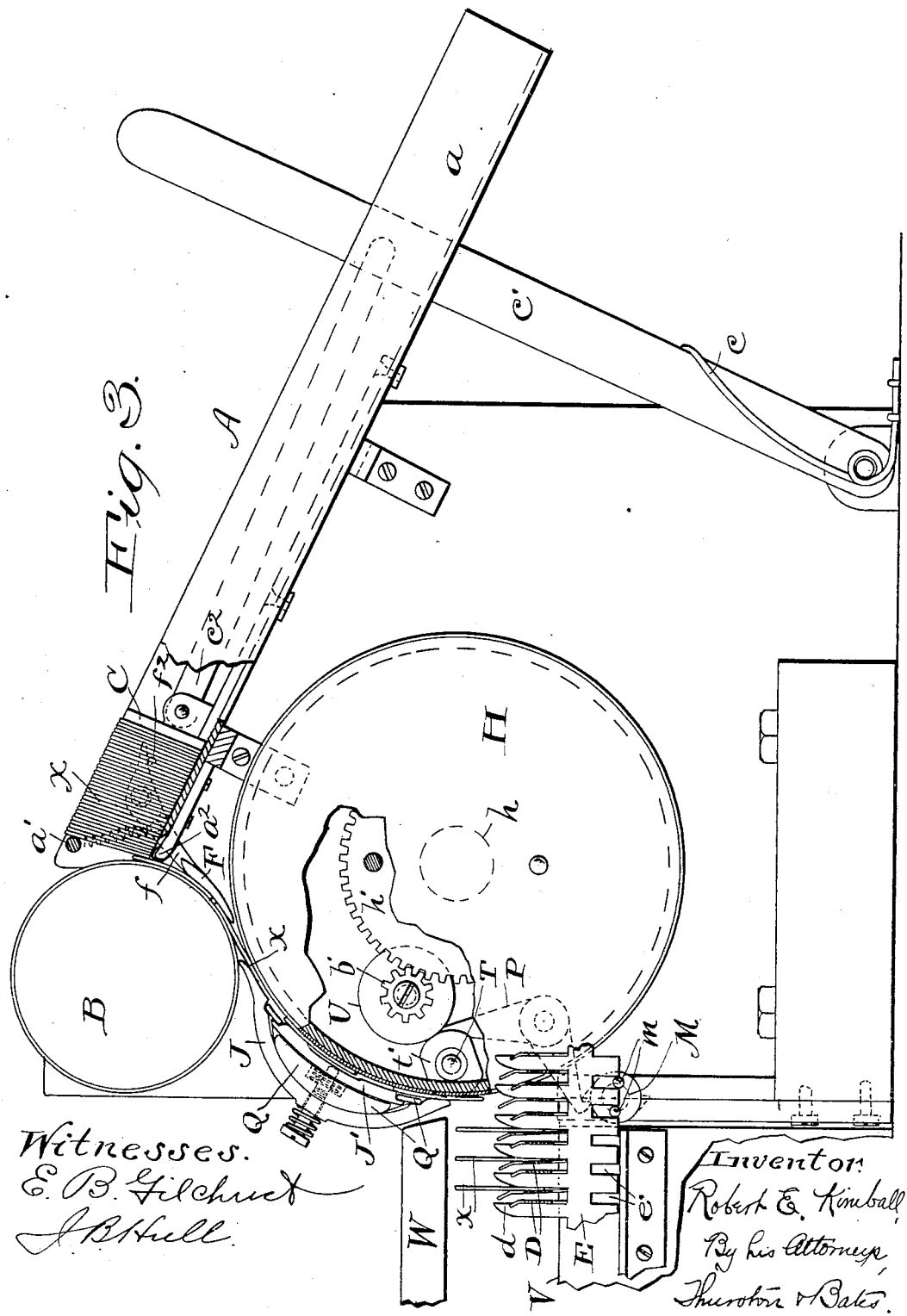
Figure 4:
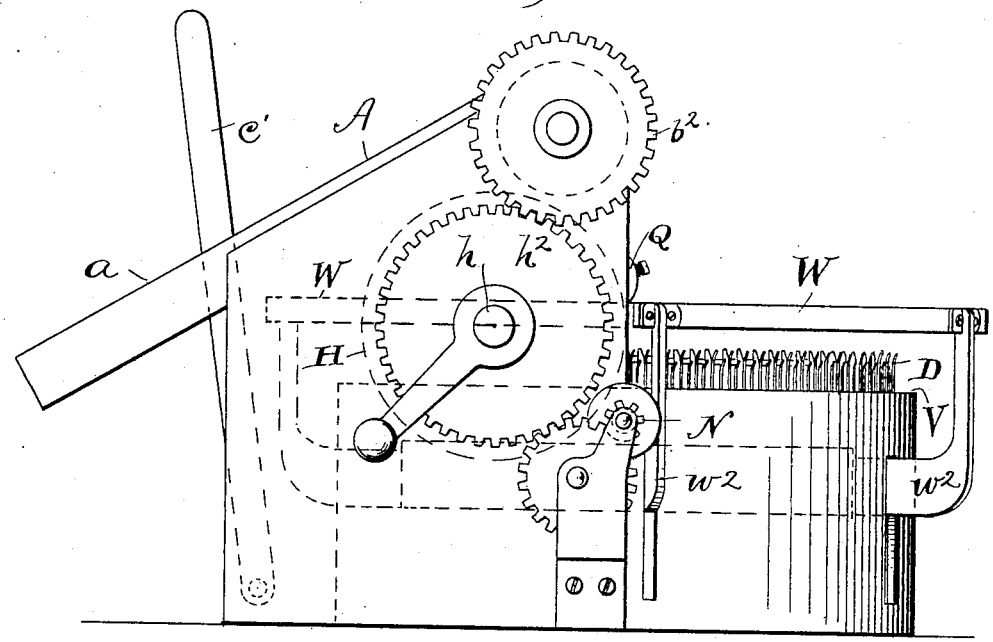
Figure 5:
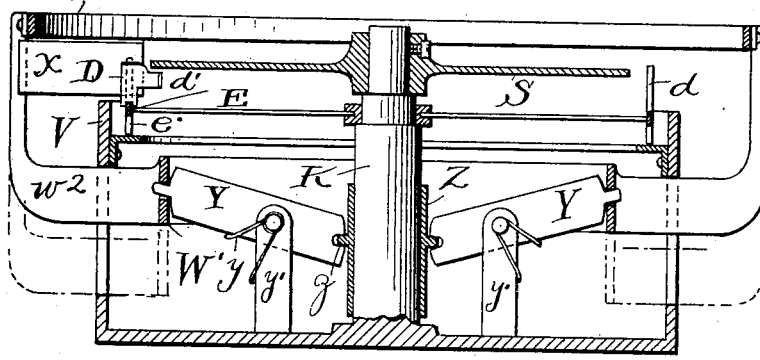

In the drawings, Figure 1 is a plan view of the machine. Fig. 2 is an end elevation of the segregating mechanism viewed in the direction of the arrow 2 on Sheet 1. Fig. 3 is a side elevation of the same mechanism, partly broken away, viewed in the direction of the arrow 3 on Sheet 1. Fig. 4 is a side elevation viewed in the direction of the arrow 4 on Sheet 1. Fig. 5 is a central vertical sectional view of the carrier and associated mechanism. Fig. 6 is a vertical sectional view of the segregating mechanism on line 6 6 of Fig. 2. Figs. 7 and 8 are two opposite side views of the springs used for the spring-clips, and Fig. 9 is a plan view thereof, and Fig. 10 is a view thereof looking toward the axis of the carrier, and Fig. 11 is a sectional side elevation of some of the parts shown in Fig. 6 when they are at rest.

A package of tickets X to be counted is placed upon a table A, the tickets resting upon their edges. This table has side flanges $a$, which serve as guides and give the table a trough-like formation. At one end of this table is a rotating roller B, whose surface is covered or partly covered with some friction-producing material—as, for example, vulcanized rubber. In the preferred construction the roller is enlarged in diameter near its ends, and such enlarged portions only are covered with the rubber. Because of this construction the power to move the tickets is applied near both ends thereof, and tipping of the tickets is thereby prevented. A follower C presses the tickets along the table toward the delivery end thereof, so that the lower part of the foremost ticket in the package will contact with this roller, while the upper part of said ticket will be pressed against the cross-bar $a'$, which coöperates with the follower in holding the tickets in a compact package. The follower is under tension of a spring $c$, whose power is exerted through the lever $c'$ and link $c^2$ to force said follower toward the delivery end of the table.

The foremost ticket in the package does not rest upon the table, but overhangs the same, so that as the roller rotates it slips this ticket from the package, and the ticket passes between said roller and a smooth pressure-plate F, by which it is held in operative contact with the roller. In fact, several of the foremost tickets may so overhang the edge of the table, as shown. In order that only one ticket may be withdrawn at a time from the package, one or more friction-pieces $a^2$, which are preferably made of vulcanized rubber, are located at the front edge of the table. The pieces are distant from the roller about the thickness of two tickets. If, therefore, the second ticket should by reason of the friction of the first ticket upon it be impelled to move downward, this impulse is checked and the ticket restrained from such movement by the engagement with it of these friction-pieces.

The specific form of these frictional retarding-pieces is not material; but, as shown, they are rubber-faced bars or fingers. Each ticket as it passes from between the roller B and the plate F is pushed between the surface of another pressure plate or plates, J J', and another roller whose surface near its ends is covered with rubber or some analogous friction-producing material. The periphery of this second roller moves considerably faster than that of the first roller, and therefore immediately the ticket is delivered to this second roller its rate of travel is considerably accelerated, whereby the distance between it and the following ticket is increased to such an extent that as the tickets are delivered into the ticket-holders, as will be hereinafter described, they are distant from one another about half an inch, more or less. By the action of this roller H the tickets are carried along between it and the plates J J' and are delivered into the embrace of holders in the form of spring-clips D, a large number of which are secured to the edge of a movable carrier E, and means are provided whereby immediately after the delivery of a ticket into one of these clips the carrier is moved a distance sufficiently great to bring the next clip into position to receive the following ticket. In the construction shown the carrier is a wheel rotatably mounted upon a fixed vertical stud K. In the construction shown about one hundred of these clips, more or less, are intended to be employed, although the drawing shows only a few of such clips secured to the part of the carrier which is adjacent to the segregating mechanism, the others being merely indicated by the circular dotted lines. In the construction shown each clip consists of a fixed pin $d$ and a spring-plate $d'$, the upper edges of which two parts diverge slightly. The spring-plate, as shown, is one end of a U-shaped spring, the other end of which is secured upon the rim of the carrier-wheel and to the adjacent pin $d$, entering notches in said adjacent pins. Any other form of spring-clip may be employed in lieu of that shown, as, indeed, may any other form of ticket-holder. This carrier-wheel E is provided on its under side with a rack $e'$, and a two-toothed pinion $m$, secured to a rotatable shaft M, is provided with a clutch-like device which is rendered effective for connecting the shaft with the source of power by the action of a ticket itself upon suitable mechanism provided. In the construction shown a geared sleeve N is rotatably mounted upon the shaft M, and it is driven whenever the machine is in operation by suitable mechanism—as, for example, a train of gears between it and the main shaft $h$. Adjacent to this geared sleeve there is a collar O, which is clamped lightly upon the shaft M, and this collar rotates with the sleeve because of the engagement of a pin $n'$, carried by the sleeve, with the collar. There is sufficient friction between this collar and the shaft to compel the latter to rotate in unison with it, provided it is permitted to do so; but in the construction shown the shaft is provided with two ratchet-teeth $m'$ $m'$, and a spring-detent P, which is pivoted to the framework of the machine, is adapted to engage with these teeth, and thus prevent the shaft from rotating. The tail of this detent, however, lies in the path of a cam $t$, secured to a friction-roller $t'$, having two flat sides, which roller turns upon a fixed stud T. A constantly-driven roller U, rotatable upon a fixed stud, is placed adjacent to this friction-roller and is of such size that it will engage with the cylindrical part of the roller $t'$, and when so engaging it will cause it to rotate so long as its engagement is maintained. When said roller $t'$, however, is turned so that its flat side is again presented to this driving-roller U, the contact between them is broken, and therefore the roller $t'$ and the cam to which it is attached come to rest in the position shown in Fig. 11. A spring-lever S comes into contact with the flat side of the roller $t'$ (when a ticket has passed out from between the roller and lever) and acts to prevent the movement of the roller $t'$ beyond the "rest" position referred to. A slight motion, however, is imparted to the roller $t'$ by each ticket as it passes through the segregating mechanism. This flat-sided roller is placed close to the segregating-roller H and in such relation thereto that the cylindrical part of said flat-sided roller projects slightly beyond the periphery of the segregating-roller. As the ticket X is being moved along by this segregating-roller the projecting end thereof will come in contact with the cylindrical portion of this flat-sided roller $t'$, and the ticket will be held against this roller with sufficient force for the purpose by the action of a spring-lever S. The friction of the traveling ticket against the cylindrical portion of this flat-sided roller is sufficient to cause the latter to turn a little, but enough to bring its cylindrical portion in contact with the driving-roller U, whereupon said roller $t'$ is turned one-half of a revolution by the combined action of the ticket and said driving-roller. As it so turns the cam $t$ strikes the tail of the detent P and lifts it, thereby freeing the shaft M from the restraining influence, whereupon said shaft is set in rotation and it makes one-half a revolution only. The cam $t$ releases the detent P when the roller $t'$ has nearly completed its brief movement, wherefore the detent is released the instant before the ticket which set roller $t'$ in motion has been delivered into a clip. The shaft thereupon turns one-half of a revolution and is stopped where the detent engages the other tooth upon it, thereby stopping said shaft. During this half-revolution of said shaft, the greater part of which takes place after the ticket has been delivered into a clip, the carrier is moved, as before stated, a distance equal to the space between two adjacent clips.

While it is unimportant what particular mechanism may be employed for driving these various shafts and rollers referred to, it may be explained that in the specific construction shown, in addition to the driving mechanism heretofore described, there is to be found a gear $h'$, which meshes with a gear $b'$, attached to the friction-roller U, and that the shaft to which roller B is attached carries a gear $b^2$, which meshes with a gear $h^2$ on shaft $h$. It might also be here stated that the pressure-plates F and J, between which and the segregating-rollers B and H the tickets pass and which act to hold said tickets against the rollers, should be somewhat yielding. For example, the friction-plates F, associated with the first segregating-roller B, are attached to levers $f$, which are under the influence of springs $f'$, holding them in the normally proper position, and they are prevented from moving too close to the roller by stop-pins $f^2$, with which the tails of these levers engage. If a ticket passes which is thicker than those for which the machine is specifically adjusted, these friction-plates would yield sufficiently for the purpose, and, in fact, they are so placed that they commonly yield a little when any ticket passes. The pressure-plates J J', as shown, are supported by a fixed bracket-bar Q and are yieldingly pressed by springs toward the roller H.

The clip-carrier E rotates upon a vertical stud K, to which is rigidly fastened an indicator-plate S, whose edge is adjacent to but just inside the clips. Upon the surface of this indicator-plate there are subdivisions whose spacing corresponds with the distance between adjacent clips, and these spaces on this plate are provided with indicating-figures, the zero of the indications being in line with the clip into which the tickets are delivered by the segregating mechanism—that is to say, the clip which is about to receive a ticket is adjacent to the zero of the indications. Following the delivery of a ticket into a clip the carrier moves one space, and this action takes place every time a ticket comes into a clip. The indicator-plate does not move, and therefore the first ticket delivered into the carrier will whenever the mechanism stops be in alinement with that figure on the indicator-plate which shows the total number of tickets which have been delivered into the clips. Thus if one puts upon the table a package of tickets and the mechanism is set in operation these tickets will be separated and delivered successively into the successive clips on the clip-carrier, and when all the tickets have been so delivered there will be no further movement of the clip-carrier, and one may read upon the indicator-plate exactly the number of tickets which have been so delivered. All the tickets are separated a distance great enough to permit them to be easily inspected. An inspection of the filled clip-holder will show almost immediately, even to the untrained eye, whether all of the clips have been filled or whether any clip contains more than one ticket, as well as whether all of the pieces in the clip-holders are tickets or something else.

To simultaneously remove all of the tickets from the clips, a vertically-movable bar W is provided, which normally occupies a position just above the projecting outer ends of the tickets. Therefore by pushing this bar downward the outer ends of all of the tickets are pushed downward. To render this movement effective in removing the tickets from the clips, a fixed fulcrum-bar V is placed just outside of the clip-holders and below the plane of the tickets therein, wherefore as the movable bar W presses down the outer ends of these tickets the tickets rock upon this fixed bar V as a fulcrum, wherefore their inner ends are pulled out of the embrace of the clips. In the specific construction shown the clip-carrier is a wheel, and these two bars are therefore of similar shape. The movable ring-shaped bar W is rigidly fastened by arms $w^2$ to another ring, W', which is slotted to receive the inner ends of a plurality of radial levers Y, which are respectively pivoted to fixed standards $y'$, and the inner ends of these levers are slotted and take over a flange $z$ on a sleeve Z, which is movable vertically upon the central stud K. By reason of this construction the ring-shaped bar W in its entirety will move vertically up or down whether the force to so move it be applied upon one side or another. The ring-shaped bar W is held in its elevated position by the action of one or more springs upon these levers.

Ordinarily the tickets after they have been counted and inspected are not used again, but are destroyed. The machine may be secured over the flat table, whereon the tickets will fall as they are removed from the clips, or it may be placed and held over a chute or funnel into which the tickets will fall as they are removed from the clips, whereby the tickets will be delivered directly or indirectly to any suitable mechanism for mutilating or destroying them.

Having described my invention, I claim—

1. The combination of a movable carrier, a plurality of ticket-holders secured thereon, mechanism for segregating the tickets of a package and delivering them singly into said holders, and mechanism for indicating the number of tickets so delivered to said holders.

2. The combination of a movable carrier, a plurality of equally-spaced ticket-holders secured thereon, a fixed enumerating-scale adjacent to said carrier, and mechanism for segregating the tickets in a package and delivering them singly into successive holders.

3. The combination of a movable carrier, a plurality of ticket-holders secured thereon, mechanism for segregating the tickets of a package and delivering them singly into said holders, mechanism for indicating the number of tickets so delivered to said holders, and mechanism for simultaneously discharging all of the tickets from said holders.

4. The combination of a movable carrier, a plurality of ticket-holders secured thereon, mechanism for segregating the tickets in a package and delivering them singly to said holders, and mechanism which is set in motion by the several tickets as they pass through the segregating mechanism for imparting a step-by-step movement to said carrier.

5. The combination of a movable carrier, a plurality of ticket-holders secured thereon, mechanism for segregating the tickets in a package and delivering them singly to said holders, and mechanism which is set in motion by the several tickets as they pass through the segregating mechanism for imparting a step-by-step movement to said carrier, and a fixed enumerating-scale adjacent to said carrier.

6. The combination of a movable carrier, a plurality of equally-spaced spring-clips secured thereto, mechanism for delivering tickets singly into the embrace of said clips, a movable release-bar located above the projecting ends of said tickets whereby through the movement of said bar all of the tickets may be simultaneously withdrawn from said clips.

7. The combination of a movable carrier, a plurality of equally-spaced spring-clips secured thereto, mechanism for delivering tickets singly into the embrace of said clips, a movable release-bar located above the projecting ends of said tickets, and a fixed fulcrum-bar located below the tickets in said clips and in a plane between the clips and the releasing-bar.

8. The combination of a circular carrier, a stud on which it turns, a plurality of spring-clips secured to said carrier near the edge thereof, mechanism for delivering tickets singly into the embrace of said clips, a ring-shaped releasing-bar, a sleeve slidable upon said stud and a plurality of spring-actuated levers whose outer ends support said releasing-bar and whose inner ends engage with said sleeve.

9. The combination of two parallel rotating segregating-rollers having different peripheral speeds, said rollers being so located that the distance between their peripheries is less than the width of a ticket such as the machine is adapted to operate upon, guide-plates for holding tickets against said rollers, a table whose discharge end is adjacent to the slower roller, which table is adapted to support a package of tickets on edge, means for moving the tickets along said table toward said slower roller whereby the first ticket of the package is pressed against the periphery of said roller.

10. The combination of two parallel rotating segregating-rollers having different peripheral speeds, spring-pressed guide-plates for holding the tickets against said rollers, a table whose discharge end is adjacent to the slower roller, and means for moving a package on the table toward the discharge end thereof to cause the first ticket of the package to engage with said roller.

11. The combination of two parallel rotating segregating-rollers having different peripheral speeds, guide-plates for holding the tickets against said rollers, a table whose discharge end is adjacent to the slower roller, and means for moving a package on the table toward the discharge end thereof to cause the first ticket of the package to engage with said roller, and friction-fingers at the discharging end of said table for restraining the movement of the second ticket in said package.

12. The combination of a movable carrier, ticket-holders thereon, and mechanism for severally moving tickets toward and into said holders, a shaft, and intermediate mechanism whereby said shaft moves said carrier, escapement mechanism restraining the shaft from movement, and mechanism set in motion by the several moving tickets for tripping said escapement.

13. The combination of a movable carrier having a rack, a plurality of ticket-holders secured to said carrier, a shaft having ratchet-teeth and a pinion engaging with said rack, friction driving mechanism for said shaft, a detent engaging said ratchets, and mechanism which is set in motion by the several moving tickets for withdrawing said detent from engagement with said ratchets.

14. The combination of a rotating segregating-roller for moving tickets toward a delivery-point, a guide-plate for holding the tickets against said roller, a flat-sided roller which projects into the path of said tickets, a driving-roller adapted to engage with the cylindrical portion of said flat-sided roller, and mechanism operated by said flat-sided roller.

15. The combination of a movable carrier, ticket-holders secured thereto, a rotating segregating-roller for moving the tickets toward and into said holders, a rotatable shaft, and mechanism whereby the shaft moves said carrier, ratchets upon said shaft, a spring-detent engaging said ratchets, a friction-drive for said shaft, a parallel shaft on which is secured a cam, which engages with said detent, and a flat-sided roller whose cylindrical periphery is in the path of the moving tickets, and a driving-roller adapted to engage with the cylindrical periphery of said flat-sided roller to drive the same.

16. The combination of a movable carrier, a plurality of ticket-holders secured thereon, a shaft, an intermediate mechanism whereby it moves said holder, a flat-sided roller in the path of the moving tickets, a driving-roller for said flat-sided roller, and mechanism operated by said flat-sided roller for operatively connecting said shaft with the source of power.

In testimony whereof I hereunto affix my signature in the presence of two witnesses.

ROBERT E. KIMBALL.

Witnesses:
E. B. GILCHRIST,
E. L. THURSTON.